United States Patent [19]

Kiwiet

[11] 3,757,095

[45] Sept. 4, 1973

[54] NUMERICAL CONTROL SYSTEM

[75] Inventor: William B. Kiwiet, Beaverton, Oreg.

[73] Assignee: Tektronix, Inc., Beaverton, Oreg.

[22] Filed: Aug. 26, 1970

[21] Appl. No.: 66,979

[52] U.S. Cl........ 235/151.11, 235/150.31, 318/571, 340/324 A, 318/565
[51] Int. Cl. ............................................ G05b 19/24
[58] Field of Search.................. 235/151.11, 150.31; 318/569, 570, 571, 574, 600, 601, 603, 651, 565; 340/324 A

[56] References Cited
UNITED STATES PATENTS

| 3,510,865 | 5/1970 | Callahan et al. | 340/324 A |
| 3,426,238 | 2/1969 | Gibson | 315/12 |
| 3,539,896 | 11/1970 | Reuteler et al. | 318/571 |
| 3,219,894 | 11/1965 | Rosch | 318/569 X |
| 3,530,283 | 9/1970 | McDaniel | 235/151.11 X |
| 3,286,085 | 11/1966 | Rado | 318/600 X |
| 3,428,876 | 2/1969 | Kelling | 318/603 |
| 3,453,549 | 7/1969 | Payne et al. | 235/151.11 X |

OTHER PUBLICATIONS

"New Continuous Path System Uses DDA Interpolator", Henegar, Control Engineering, January, 1961, pgs. 71-76.

Primary Examiner—Eugene G. Botz
Assistant Examiner—James F. Gottman
Attorney—Buckhorn, Blore, Klarquist and Sparkman

[57] ABSTRACT

A numerical control system for operating a machine tool or the like receives successive coordinate movement instructions for controlling a device such as a cutting tool. The system employs a digital differential analyzer in each coordinate axis for generating a servo rate command, while providing linear interpolation for each movement. Feedrate is digitally controlled, with acceleration and deceleration being digitally directed for adapting the numerical control system to the particular device operated thereby. A cathode ray storage tube display provides high speed verification of input information as well as monitoring of subsequent machine operation.

47 Claims, 9 Drawing Figures

WILLIAM B. KIWIET
INVENTOR

BY
BUCKHORN, BLORE, KLARQUIST & SPARKMAN
ATTORNEYS

PATENTED SEP 4 1973

WILLIAM B. KIWIET
INVENTOR

BY

BUCKHORN, BLORE, KLARQUIST & SPARKMAN
ATTORNEYS

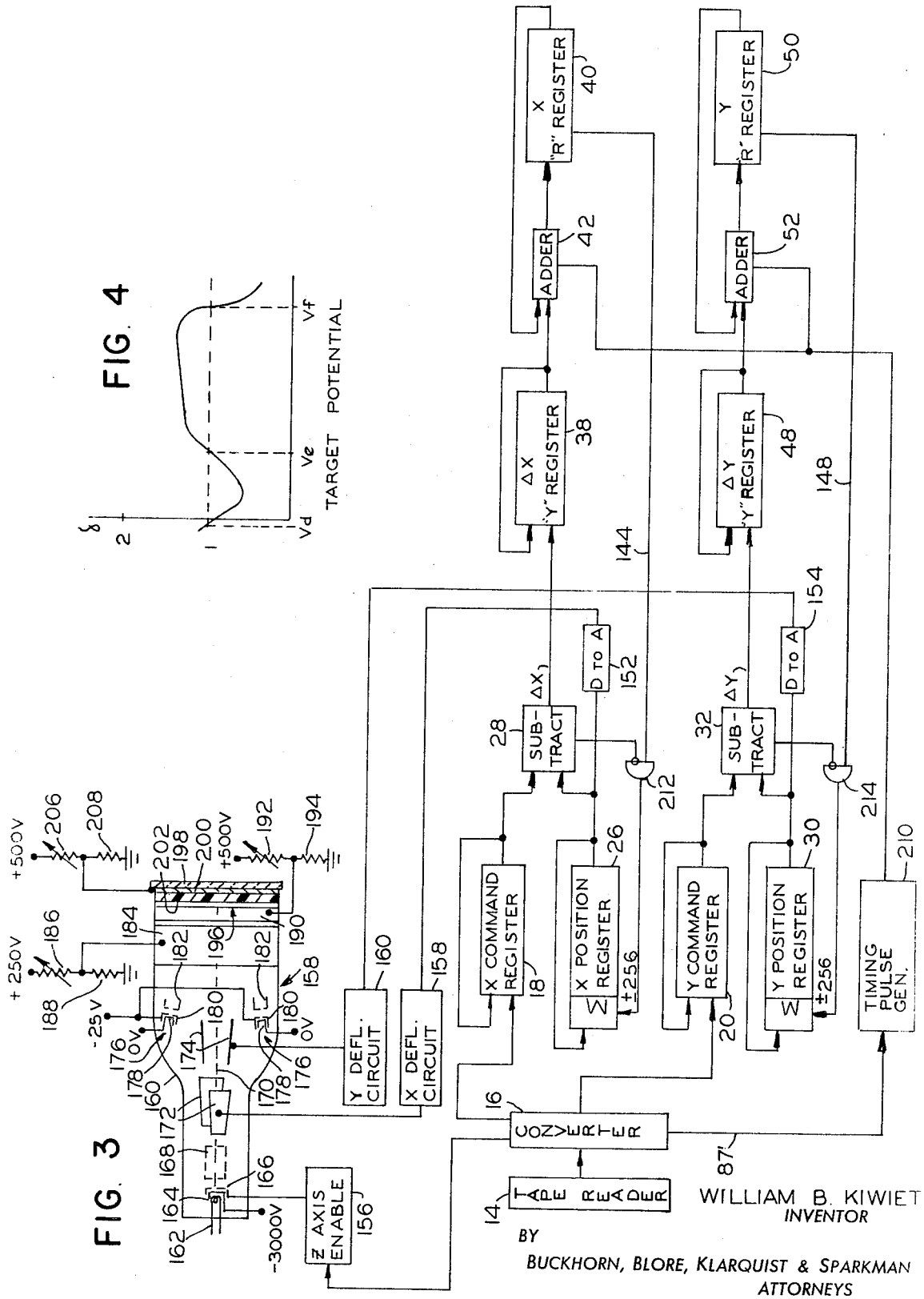

WILLIAM B. KIWIET
INVENTOR

BY
BUCKHORN, BLORE, KLARQUIST & SPARKMAN
ATTORNEYS

NUMERICAL CONTROL SYSTEM

BACKGROUND OF THE INVENTION

By means of a numerical control system, a cutting tool or similar controlled device may be moved in two or more coordinate directions over an accurately predetermined path in accordance with digital input instructions. Typically, a set of coordinate instructions, comprising a given block of information, will direct the controlled device to move from its present position to a new position the coordinates of which are digitally expressed. The successive blocks of information cause the controlled device to move through successive segments of an overall contour.

The usual numerical control system must be fairly carefully adapted to the particular machine which is to be controlled. Thus, the numerical control should not produce output signals at such a rate or such a magnitude that the controlled device will be incapable of reacting thereto. For example, controlled movement should not be commanded at a velocity which will produce an undue strain on a cutting tool or workpiece, or which can be followed only with appreciable inaccuracy between commanded movement and actual movement. The velocity or feedrate can be programed into the numerical control system as a part of the input information. However, such characteristics as acceleration to feedrate, and deceleration from feedrate to stop are ordinarily features which are non-responsive to the input instructions. Excessive following error may occur in machining of a particular product, as when the controlled device is accelerating, or overshoot error may occur during deceleration. Therefore, the numerical control system suitable for operating one machine may not be suitable for operating another.

In a typical instance, acceleration and deceleration are controlled by a ramp generator or R-C time constant circuits which are substantially preset in a given instance. The acceleration and deceleration characteristics in a given numerical control system may limit the possible velocity command, because of excessive acceleration or deceleration to and from a particular velocity.

A further disadvantage of available numerical control systems relates to the verification or checking of input data. It would generally be desirable that the input data, contained on a punched paper tape or the like, be verified before production of the particular machined part. Available verification systems are slow and cumbersome and increase the expense of system operation. Moreover, no continuous monitoring is present as to whether the numerical control system follows the previously verified data under operating conditions.

SUMMARY OF THE INVENTION

In accordance with the present invention, a numerical control system is provided wherein directed movement of the controlled device is responsive to digital feedrate information. Moreover, acceleration and deceleration are digitally controlled such that excessive following error is avoided during acceleration, and positioning without overshoot is accomplished in decelerating the controlled device. Both acceleration and deceleration are "adaptive," that is acceleration and deceleration are responsive to the capabilities and actual movement of the machine to minimize commanding an action which the controlled machine may be incapable of accurately following. The digitally controlled acceleration and deceleration also provide smooth transition between acceleration and feedrate, between feedrate and deceleration, or even between different feedrates. The adaptive nature of operation also allows the commanding of a higher feedrate than might be possible if acceleration and deceleration characteristics were preset.

According to another feature of the present invention, input data is verified by means of a display device comprising a cathode ray storage tube. The numerical control system may be operated in a rapid mode, with the actual mechanical prime movers or motors disabled, for plotting the input instructions in the form of a curve, which is then stored for continuous viewing. This stored representation of input data may then be employed for monitoring machine operation, as a second plot is superimposed over the first while the motion of the controlled device is taking place. Any deviation from the previously verified data can be readily observed.

In accordance with a particular embodiment of the present invention, the numerical control system includes input register means for providing positional error information in at least two axes, as between input information and the actual position of a controlled device. Rate command means, in the preferred form of digital differential analyzers, provide a rate command ratio according to the positional error in the two axes. The rate command means is further responsive to feedrate information which is adaptively variable in accord with the performance of the controlled device. The digital differential analyzers provide linear interpolation between the present and directed locations of a controlled device.

Digital servomechanism means, responsive to the aforementioned rate command from axis digital differential analyzers, operate positioning motors at a rate responsive to the rate command, while feedback as to the actual position attained is provided for updating input register means.

The apparatus in a particular embodiment further includes means responsive to a predetermined small error for disabling operation of the rate command means and causing the digital servomechanism means to retain a particular position. This arrangement minimizes or eliminates final positional error in the system.

In accordance with another feature of the present invention in a particular embodiment thereof, the numerical control system is provided with a converter for converting between binary coded decimal information and binary information, or the reverse, in a serial-serial mode for greatly reducing the quantity of equipment necessary for making such conversion. This device is employed for converting information from a punched paper tape to a form usable by the numerical control system, or for converting information from the control system to decimal indicating means or the like.

It is an object of the present invention to provide an improved digital control system having predictable and accurately controllable servo response.

It is a further object of the present invention to provide an improved digital control system having a predictable and accurately controllable response, and including digital feedback from a motor or other controlled mechanism.

It is a further object of the present invention to provide an improved numerical control system which employs digital differential analyzer means for the command control of positioning motors, wherein such digital differential analyzer means is responsive to an input register error indication updated by position feedback from the controlled device.

It is another object of the present invention to provide an improved and novel feedback control means for causing a digital differential analyzer to provide a predetermined feedrate.

It is a further object of the present invention to provide an improved numerical control system wherein the feedrate is digitally generated and variable.

It is an additional object of the present invention to provide an improved numerical control system with adaptive acceleration and deceleration capabilities.

It is a further object of the present invention to provide an improved numerical control system adapted to operate at increased velocities.

It is another object of the present invention to provide an improved numerical control system characterized by optional acceleration and deceleration to and from a predetermined feedrate for each block of input information.

It is a further object of the present invention to provide an improved numerical control system responsive to a digitally controlled acceleration for minimizing following error and the like.

It is a further object of the present invention to provide an improved numerical control system where deceleration is digitally based and adaptive for minimizing overshoot and the like.

It is an additional object of the present invention to provide an improved numerical control system having a servo-retaining mode responsive to minimum error information.

It is another object of the present invention to provide an improved numerical control system wherein a controlled device may be caused to accelerate, followed by immediate deceleration to position for optimum control speed for a short segment movement.

It is a further object of the present invention to provide an improved means for verifying numerical control system input data.

It is another object of the present invention to provide improved means for monitoring numerical control system operation.

It is an additional object of the present invention to provide a numerical control system wherein operation is simplified and the number required components minimized, as by provision of improved code conversion means.

The subject matter which I regard as my invention is particularly pointed out and distinctly claimed in the concluding portions of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 3 is a block diagram of input data verification means according to the present invention;

FIG. 4 is a plot of target secondary emission ratio versus target potential for a cathode ray storage tube employed as with the FIG. 3 apparatus;

DETAILED DESCRIPTION

Figure 1:
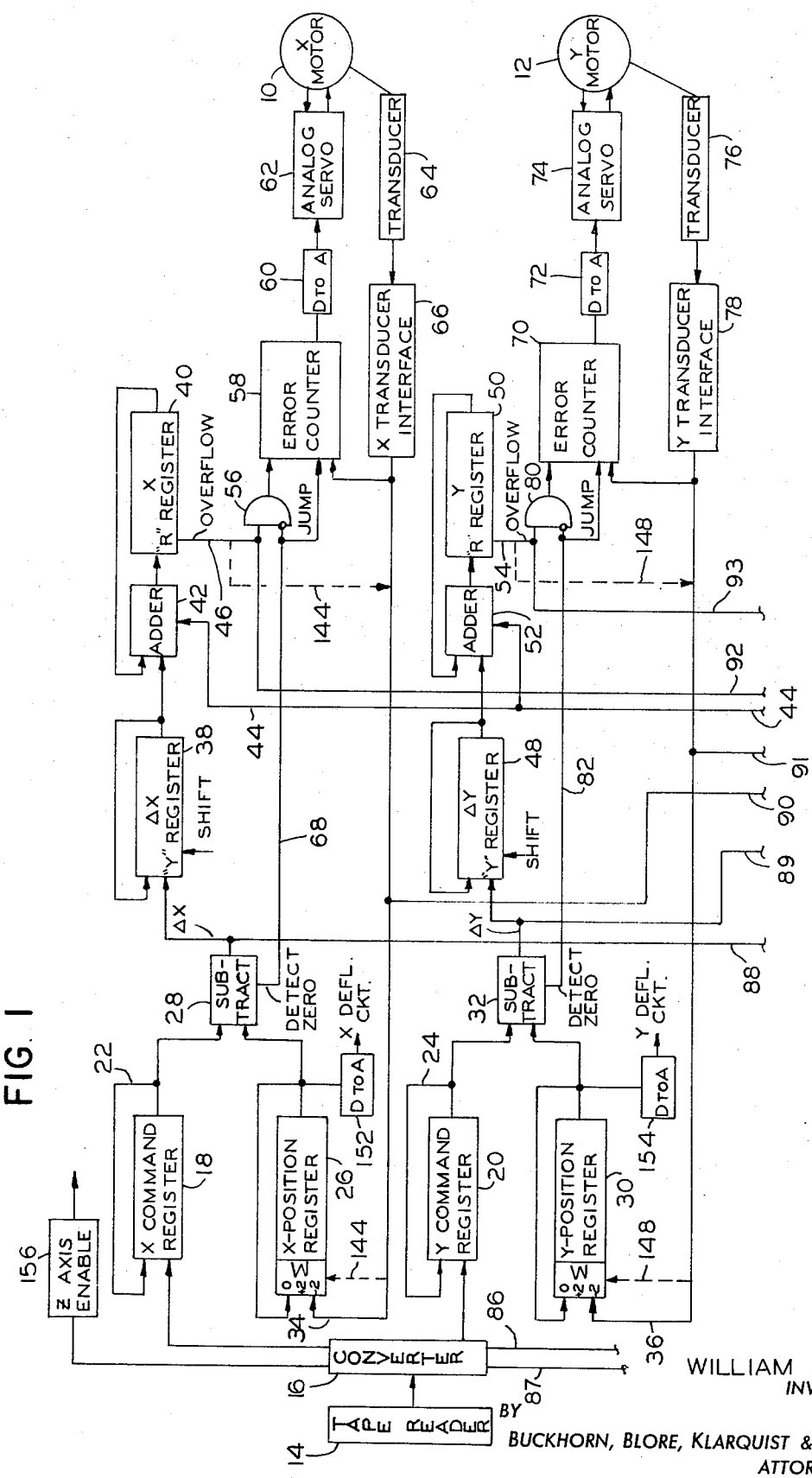
FIG. 1 is a general block diagram of a numerical control system according to the present invention.

Referring to the drawings and particularly to FIG. 1, an apparatus is illustrated for moving a controlled device along a path, such path comprising a number of segmental portions, wherein the apparatus successively receives input directive information representing each such segmental portion for causing corresponding movement of the controlled device. In a given instance the controlled device may comprise the cutting tool of a milling machine or the like adapted for movement in a first, or X, direction by rotation of X motor 10, and movement in an orthogonal direction by means of a Y motor 12. Successive movement instructions are provided upon a conventional recording tape (not shown), such as perforated paper tape, read by a tape reader 14. Successive "blocks" of information are read from the tape in a known manner, with each block including the directive information indicative of the position to which the cutting tool or other controlled device is to be moved. This information is recorded upon the tape in binary coded decimal form, along with a feedrate input value and other input instructions as hereinafter more fully described.

The input information from tape reader 14 is converted from binary coded decimal form to straight binary form in converter 16 to simplify the processing of the information. The X coordinate of the location to which the controlled device is to be moved is coupled into X command register 18, while the Y coordinate is transferred into Y command register 20. Each of these registers, as well as most of the other registers employed herein, comprise 24 bit shift registers wherein the information stored continuously circulates, as indicated by leads 22 and 24 respectively, at a clock frequency of 2 megahertz.

The X command register 18 together with X position register 26 and subtract circuit 28 form a first input register means according to the present invention. Similarly, Y command register 20 together with Y position register 30 and subtract circuit 32 form a second input register means according to the present invention.

The position registers 26 and 30 store the digital coordinate representations of the actual position of the controlled device. The position registers are connected as dynamic counters such that inputs provided on leads 34 and 36 respectively increase or decrease the content of the register by one unit, here indicative of 0.0002 inches, in a coordinate direction. Otherwise, the information circulates in the position registers in the same manner as hereinbefore described with respect to the command registers.

Command register 18 and position register 26 provide respective inputs for subtract circuit 28 the latter developing the difference therebetween indicated as $\Delta X$. Also a difference, $\Delta Y$, between the content of registers 20 and 30 is provided by subtract circuit 32. The subtract circuits 28 and 32 provide the digital represented positional error in X and Y coordinate directions existing between the commanded position for a controlled device, and its actual position.

The difference, $\Delta X$ is provided as an input to a rate command means here comprising a digital differential analyzer. This digital differential analyzer develops an output pulse rate proportional to the digital error information, $\Delta X$, as well as proportional to a feedrate command. The digital differential analyzer comprises a $\Delta X$ "Y" register 38, an X "R" register 40, and an adder 42. The error information, $\Delta X$, is entered into register 38, initially in the lower order bit positions thereof, and this information is circulated as hereinbefore described in connection with register 18. The contents of register 38, after normalizing as hereinafter described, are added to register 40 by means of adder 42, after which such addition circulates through register 40 and adder 42. Addition is repeatedly accomplished at a predetermined rate (every 12.5 microseconds) as long as a feedrate command is provided adder 42 on lead 44. As a sufficient number of additions take place, register 40 will overflow providing a pulse output on lead 46, after which adding continues. The frequency of the output pulse at 46 is proportional to $\Delta X$ as well as being proportional to a feedrate input determination as hereinafter described.

Similarly, the $\Delta Y$ information is entered initially into the lower order bit positions of $\Delta Y$ "Y" register 48 from which it is repeatedly added to contents of Y "R" register 50 via adder 52. The frequency of the overflow at 54 will be proportional to $\Delta Y$, as well as to a feedrate command on lead 44. Elements 48, 50, and 52 comprise a second digital differential analyzer.

Since the frequency of addition is determined by a common feedrate command which is the same for each digital differential analyzer, it will be seen the outputs on leads 46 and 54 are exactly proportional to $\Delta X$ and $\Delta Y$, respectively. The outputs at 46 and 54 can then be used as rate commands to digitally operated servomechanism means for controlling motors 10 and 12, with the two rate outputs at 46 and 54 having the correct frequency ratio for causing movement of the controlled device in a constant direction for reducing error values $\Delta X$ and $\Delta Y$ to zero. The digital differential analyzers thus perform the function of linear interpolation between a present position of a controlled device and the commanded position thereof.

In order to avoid unwanted differences in rate of movement of the controlled device with the actual distance being traversed thereby during a linear movement, the contents of registers 38 and 48 are first normalized. That is, the contents of both registers 38 and 48 are moved simultaneously from the lower order bit positions of each register to the higher order bit positions until a digit in one register or the other reaches the higher order bit position thereof. At this point, shifting is stopped and operation of the digital differential analyzers may be begun. The ratio between the $\Delta X$ and $\Delta Y$ information is preserved while retaining a high overflow pulse rate substantially responsive to the feedrate command on lead 44.

The rate command information on leads 46 and 54 is provided respectively to X and Y axis digital servomechanism means. Referring first to X axis digital servomechanism means, the pulse output on lead 46 is applied through and-gate 56 to an error counter 58, the output of which is applied to a conventional digital to analog converter 60. Counter 58 as well as counter 70 are ten bit binary reversible counters and are normally employed as a buffer for allowing position and velocity lag in the overall servomechanism. The converter 60 converts the error output into a bipolar analog voltage to drive the preamplifier of servo 62. Velocity servomechanism 62 includes power amplifier means for providing an operating input to X motor 10. Analog servomechanism 62 also receives tachometer feedback from X motor 10 and operates in a conventional manner for rotating motor 10 at substantially the dictated rate.

In a constant velocity situation, for instance, the output from error counter 58 is a constant velocity command. After digital to analog conversion, it is amplified and compared, analog-wise, with the actual velocity of the machine, detected with a tachometer. The difference operates the machine.

A transducer 64 is also connected to the output shaft of motor 10, this transducer comprising means for providing digital rate and position feedback. The transducer produces digital pulse outputs in response to analog input, phased according to direction of rotation. In a specific embodiment the transducer comprised a Baldwin shaft position encoder, Model 75Z-1, manufactured by Baldwin Electronics, Incorporated, Little Rock, Arkansas. The output of transducer 64 is coupled via X transducer interface 66 (hereinafter more fully described) as a second input to error counter 58, and as the counting input on lead 34 for register 26. Thus, as the X motor 10 responds to servo 62, transducer 64 provides pulses to error counter 58 for advancing or reducing the total count thereof toward a predetermined value for which converter 60 produces zero output, indicating compliance with the input command. The loop comprising the error counter 58, converter 60, servo 62, transducer 64, and interface 66 therefore comprises a digital rate servomechanism causing the X motor 10 to be responsive to rate information dictated by the frequency of the output pulse from the X digital differential analyzer on lead 46. Also, the digital information from the transducer 64 updates the position in register 26 whereby the $\Delta X$ output from subtract circuit 28 is eventually reduced to zero. It should be noted, however, that in the described embodiment of the invention for executing linear interpolation in response to segmental instructions, the $\Delta X$ information from subtract circuit 28 is entered into register 38 only at the start of each interpolation, that is when new information is entered into X command register 18 from converter 16, and before position register 26 responds. Timing circuitry for the apparatus according to the present invention will be well understood by those skilled in the art, and therefore will not be described herein.

When $\Delta X$ nears zero, for instance when the remaining difference reduces to one bit indicative of a position difference of less than 0.0002 inches, subtract circuit 28 provides a "detect zero" output on lead 68. The signal on line 68 inhibits gate 56 whereby error counter 58 no longer receives the overflow pulse on lead 46. Furthermore, the same signal on line 68 is employed as a "jump" command to error counter 58 whereby to set the latter to a given value for "servo-retaining" purposes. In a particular embodiment, this predetermined value was the number 512 in binary form, which, when applied to digital to analog converter 60, causes a zero input at analog servo 62. Prior to the execution of the "jump" instruction, error counter 58 may contain a count greater than or less than 512, in accordance with the direction of commanded movement and according to whether an acceleration or deceleration may have been taking place. However, upon a "detect zero" signal on line 68, the count in error counter 58 is changed to 512 and the digital servomechanism is then employed to maintain this value in error counter 58. As a consequence, motor 10 will be retained in a given position. During servo-retaining, error correcting voltage is produced proportional to positioning error. To enhance the servo-retaining mode, analog servo 62 is provided with increased amplifier gain, at this time, near its zero input value. Consequently, any tendency for movement on the part of X motor 10 will be countered by a strong output from analog servo 62 as error counter 58 changes at all from the 512 value. The servo-retaining mode, according to the present invention, is of appreciable value in minimizing error and providing enhanced accuracy in the directed positioning of the controlled device. It will, of course, be appreciated that each block of information on an input tape read by tape reader 14 may direct another movement of motor 10. Consequently, the servo-retaining mode may have a very short duration, or may be nonexistent as in an anticipation mode of operation, hereinafter described, wherein a nearly constant feedrate is attained from one segmental movement to the next.

The Y axis digital servomechanism similarly comprises error counter 70 driving digital to analog converter 72, which in turn provides the input to velocity analog servo 74. Transducer 76, which may be identical to transducer 64, provides an input to error counter 70 for causing error counter 70 to count in the opposite direction from the input supplied via and-gate 80 on lead 54. Normally, the pulse output 54 is counted by error counter 70 which applies a corresponding analog signal to servo 74 via converter 72. Analog servo 74 provides the power output to Y motor 12, while a tachometer operated by the motor shaft supplies the feedback to analog servo 74. Transducer 76 supplies a pulse output in response to motor rotation, which is applied to error counter 70 by way of interface 78 for changing the counter in error counter 70, e.g., to the 512 value. Also, the pulse output from transducer 76 is effective through interface 78 and lead 36 for causing Y position register 30 to count for reducing the difference detected by subtract circuit 32. When the subtract circuit 32 detects a difference indicative of less than 0.0002 inches between the registers 20 and 30, a signal on lead 82 inhibits operation of gate 80 and causes error counter 70 to "jump" to the 512 value for servo-retaining in the same manner as hereindescribed in connection with the X axis digital servomechanism.

Figure 2:
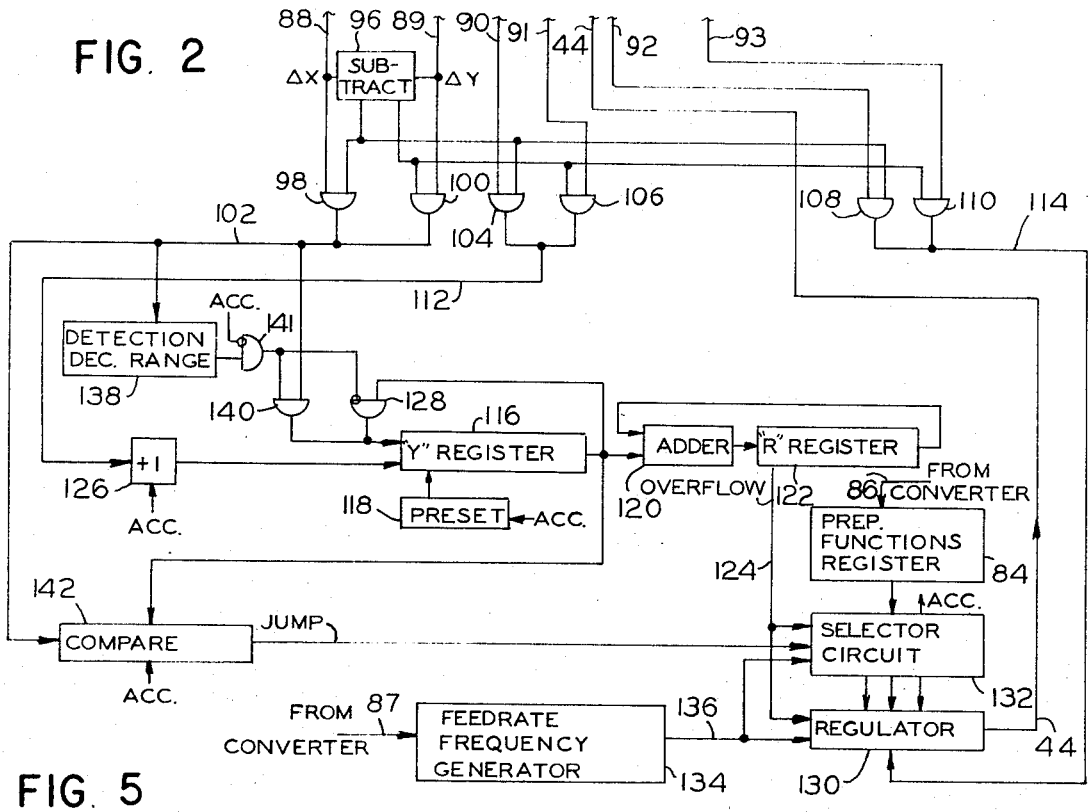
FIG. 2 is a further portion of the FIG. 1 circuit, particularly illustrating feedrate control apparatus.

The apparatus according to the present invention has two general modes of operation as selected by preparatory functions register 84 in FIG. 2. The first or mode A is the normal mode, for applying acceleration and deceleration for every block of input information on the tape read by reader 14. The second mode, mode B, is an anticipation mode applying acceleration in the first block only and deceleration in the last block only. For blocks in between, acceleration and deceleration may be substantially skipped and the tape reader is started before completion of the previous block, i.e., at the point in time where deceleration would occur in the normal mode A. The input instructions as to whether mode A or mode B is desired are given with each block of information on the tape, as read by tape reader 14. This information is supplied to register 84 as indicated at 86. As long as mode A is designated, each block is read, and the servo system comes to a substantial halt, with motors 10 and 12 in servo-retaining condition, before tape reader 14 is operated to read the next block of information.

The circuit of FIG. 2 is interconnected with the circuit of FIG. 1 by leads numbered 44 and 86 through 93. Leads 88 and 89 carry the $\Delta X$ and $\Delta Y$ signals from subtract circuits 28 and 32. Leads 90 and 91 provide the position feedback pulses, and leads 92 and 93 carry the output or overflow pulses from registers 40 and 50. As hereinbefore mentioned, lead 44 delivers the feedrate command to the FIG. 1 circuit.

Leads 88 and 89 in FIG. 2 provide inputs for subtract circuit 96 as well as being respectively connected to and-gates 98 and 100. Subtract circuit 96 energizes one or the other of gates 98 and 100 according to whether the $\Delta X$ or the $\Delta Y$ signal is larger. The larger error will then control system operation. If the $\Delta X$ signal is larger, gate 98 from subtract circuit is energized for passing the $\Delta X$ output to lead 102. If, on the other hand, the $\Delta Y$ signal is larger, then gate 100 is energized to provide the $\Delta Y$ value on lead 102. Subtract circuit 96 similarly energizes pairs of and-gates 104, 106 and 108, 110, so that position feedback information is provided on lead 112 for the axis having the larger delta, and so that the digital differential analyzer overflow is provided on lead 114 for the axis having the larger delta.

At the beginning of each block of information in mode A, "Y" register 116 is preset to a predetermined small value by preset means 118 in accord with an acceleration command from selector circuit 132. Register 116 together with adder 120 and "R" register 122 form a digital differential analyzer operating in substantially the same manner as hereinbefore described for this type of circuitry to provide a pulse output on lead 124, the frequency of which is proportional to the digital content of the "Y" register 116. In this instance, repeated addition takes place in adder 120 at a constant rate, repeatedly adding the contents of register 116 to register 122. During acceleration, at the start of a block of input information, an add-one circuit 126 is energized providing successive increases for the value in register 116. And-gate 128 is also energized at this time to provide normal recirculation of the pulse train through register 116.

During acceleration, the number preset into register 116 via means 118 initially determines the overflow pulse rate on lead 124. This value is applied to a regulator 130 which comprises a comparison circuit. In regulator 130, the frequency of the pulse output overflow from the axis digital differential analyzer (in FIG. 1) for the axis havin the larger delta, such pulse appearing on line 114, is compared frequency-wise with the overflow 124 from register 122. The regulator 130 then provides an appropriate feedrate command on lead 44 for causing the axis digital differential analyzer (in FIG. 1) for the axis with the larger delta to produce the same overflow pulse rate as the overflow pulse rate on lead 124. The regulator 130 forms part of a feedback combination for controlling the pulse output rates on leads 46 and 54, and thus the velocity which motors 10 and 12 are required to follow. The feedrate command on lead 44 is applied to both adders 42 and 52, even though the rate signal in the axis having the larger delta is employed for feedback.

Initially, the velocity rate commanded will be fairly low in accordance with a low value usually preset into register 116 by means 118. The commanded velocity of the system will remain low until a system response occurs. Then, the position feedback from the axis having the larger delta, this feedback appearing on line 112, causes add-one circuit 126 to add pulses to the contents of register 116. Each feed-back pulse causes a pulse to be added. Consequently, the system will accelerate. Acceleration is adaptive, wherein further acceleration takes place as the controlled device responds. Thus, assuming the control device is a cutting tool or the like, the feedback on line 112 will indicate whether or not the cutter is responding or can respond at a prescribed rate. A machine of "low bandwidth" will be accelerated at a slower rate than a machine of "high bandwidth." Since a machine is accelerated in accordance with its capabilities, not as much data need be inserted into the apparatus according to the present invention with a change in the controlled machine, workpiece to be milled, or the like.

In a conventional machine, acceleration is frequently predetermined by a set time constant circuit, e.g., of the resistance-capacitance type. However, the acceleration characteristic provided thereby must be calculated in advance in order that the capabilities of the machine or the cut will not be exceeded. In the present apparatus, acceleration will progress in accordance with the response encountered, and therefore less information need be known in advance. Of course, the ultimate or maximum feedrate to which the motors eventually accelerate should be determined in accord with capabilities of the controlled device, but the additional acceleration factor need not be determined. It should also be noted that the acceleration command is digitally generated rather than being generated with an analog time constant circuit. This digital generation provides a completely predictable acceleration command which can be modified to serve various applications and which will enable a smooth transition from acceleration to feedrate, etc., inedpendent of the particular feedrate involved. It also enables smooth transition from acceleration to deceleration for short incremental moves as hereinafter more fully described. A machine can be accelerated or decelerated from any existing feedrate to a new commanded feedrate and will make a smooth transition.

Furthermore, as a consequence of the adaptive acceleration, excessive following error during acceleration is avoided since acceleration is controlled in accordance with acceleration accomplished. Therefore, errors in milling and the like due to following error during acceleration are avoided.

The acceleration range is quite long and acceleration from zero all the way to 255 inches per minute, for example, can be accomplished. As an additional advantage of the adaptive acceleration characteristic, loss of position feedback, e.g., on line 112, will not result in "run away" of the machine.

In mode A, selector circuit 132 compares the overflow frequency 124, with which the velocity commands at 46 and 54 are controlled, with the frequency output of a feedrAte frequency generator 134. Feedrate frequency generator 134 receives digital information on line 87 from the converter in accordance with the desired feedrate in a particular input block and generates a pulse output on lead 136 at the desired frequency. When overflow output on lead 124 reaches the commanded feedrate frequency, selector circuit 132 causes regulator 130 to switch from input at 124 to input at 136, whereby the system velocity will be commanded in accordance with the directed feedrate.

The system feedrate can be the optimum desired for the controlled device, representing the velocity of which the system is capable, with the acceleration adapting itself to the acceleration capabilities of the controlled device as hereinbefore indicated. As hereinafter also indicated, the deceleration is also adaptive and is controlled so as to arrive at the desired endpoint without overshoot, despite fairly rapid feedrate theretofore. Normally, acceleration is substantially exponential from zero velocity to feedrate, and subsequent deceleration is also substantially exponential, although these characteristics can be varied.

Operation continues at the desired feedrate until the commanded location is neared by the controlled device. A deceleration range detector 138 is coupled to receive the larger delta signal for comparison with a predetermined value which, in a constructed embodiment, was numerically equal to 0.4096 inches. When the larger delta drops below this value, detector 138 provides an output for inhibiting gate 128 and discontinuing circulation of information in register 116 (unless acceleration is commanded and inhibits gate 141). Therupon, the same delta information is entered into register 116 by way of and-gate 140. The digital differential and analyzer comprising register 116, adder 120, and register 122 again produces an overflow pulse output on lead 124, and selector circuit 132 compares the overflow frequency with the feedrate frequency on lead 136. As soon as the overflow frequency tends to be lower than the feedrate frequency, the selector circuit 132 will command the regulator to respond to the overflow frequency on lead 124 instead of a feedrate frequency on lead 136. The digital differential analyzer comprising elements 116, 120, and 122 will now command an exponential slowdown to position. Thus, the delta input to register 116 will continue to decrease and consequently the overflow rate on lead 124 will continue to decrease. Smooth transition from feedrate to deceleration is accomplished, this transition being independent of feedrate, distance, or time. The deceleration range is quite long and also the final speeds during deceleration are quite low, whereby final positioning can occur without overshoot. This deceleration mode enhances the possible speed of the machine prior to deceleration, without compromising accurate positioning. Since deceleration is also proportional to the adding frequency of the digital differential analyzer comprising elements 116, 120 and 122, deceleration can be altered to make it compatible with various machine's servo deceleration capabilities in this manner.

A change in operation directly from acceleration to deceleration is required when the delta for the move is small and/or the commanded feedrate is high. During acceleration, a continuous comparison is made between delta information on line 102 and the contents of register 116. If, during acceleration, the information in "Y" register 116 tends to be larger than the delta information on line 102, it indicates that deceleration should be started substantially immediately if the controlled device is to stop in time. Comparison circuit 142 detects this fact and provides a "jump" signal to selector circuit 132 causing the latter to command immediate entry of delta information into register 116 and immediate deceleration operation in the manner hereinbefore described. The selector circuit discontinues the acceleration command such that detector 138, which now detects a small delta, can operate gates 140 and 128 as hereinbefore described. In this case, of course, the feedrate is never reached during the particular segmental move under consideration.

This mode of operation comprising a jump from acceleration to deceleration substantially eliminates the tendency for overshoot to occur for small deltas. Smooth transition from acceleration to deceleration takes place independent of feedrate, distance or time. Optimum time response is also maintained inasmuch as acceleration is actually continued to a "half way point" of a segment movement, before deceleration starts to take place.

In mode B, as commanded in preparation functions register 84 from the tape reader 14 and converter 16, acceleration will take place only in the first block of information on the tape containing a mode B instruction, and the tape reader is started before the completion of the block for reading in new instructions. This occurs when the deceleration range is detected by detector 138. However, the output of detector 138 is otherwise normally inhibited for this mode. The selector circuit 132 is commanded by preparation functions register 84 to continue the feedrate. Acceleration or deceleration may also be commanded when there is a change in commanded velocity from one block to the next. In a particular embodiment, the controlled device can then accelerate or decelerate adaptively to the new velocity, i.e., until the desired feedrate is reached.

CHECKING MODE

According to an important feature of the present invention, a rapid checking mode is provided for verification of a perforated paper tape read by tape reader 14. In addition, the checking mode may be employed for monitoring subsequent machine operation to see if it is in accord with a previously verified tape. The checking system is not only quite fast but is less costly than known tape checkout methods.

According to the input checking mode of the present invention, internal feedback is employed by providing a closed loop which does not include an actual mechanical servo drive and position feedback. The servo drive is disabled at this time. Referring to FIG. 1, the pulse output of register 40 is coupled directly as an input to X position register 26, indicated by dashed lines 144. Also, pulse output of register 50 is connected directly as an input of Y position register 30 as indicated by dashed lines 148. The system operates to "line up" the respective position and command registers, with position checking information being taken from the respective position registers. Input data other than on punched tape can be checked.

The position register output information is supplied to a display means, desirably comprising a bistable cathode ray storage tube. The X deflection circuit for such storage tube is controlled from X position register 26 by way of digital to analog converter 152, while the Y deflection circuit for such storage tube is controlled by Y position register 30 via digital to analog converter 154. Z axis enable information is derived from the tape as translated by converter 16 and applied to Z axis enable circuit 156. The latter is effective for controlling the presentation of an electron beam for producing a trace corresponding to the segmental movement instructions for each block of information on the tape, as desired.

Referring to FIG. 3, the checking mode connections are illustrated in greater detail. In the FIG. 3 diagram, like elements are referred to with like reference numerals, and correspond to those similarly illustrated in FIG. 1. However, only those portions of the FIG. 1 circuit are shown which are useful in providing an initial rapid verification of the tape provided. The information from the tape is coupled to bistable cathode ray storage tube 158 which will display, in a semi-permanent manner, the contour corresponding to the segmental tape instructions. This contour will be the same as would be executed by motors 10 and 12 for directing a cutting means in a machine tool or the like in response to the same input tape operated at a lower speed.

Referring more particularly to bistable cathode ray storage tube 158, this tube includes an envelope 160 formed of insulating material housing a principal electron gun including a filament 162 and cathode 164 connected to a high negative voltage, a control grid at 166, and a focusing and accelerating structure 168. The electron beam 170 produced by the principal electron gun is deflected horizontally by means of horizontal deflection plates 172 and vertically by means of vertical deflection plates 174. The beam is directed toward a target 196 at the opposite end of the tube. The storage tube is additionally provided with one or more flood type electron guns 176 each having a cathode 178, a control grid 180, and an anode 182, and which are supported inside the envelope 160 adjacent the end of the vertical deflection plates 174 closest the target. Cathodes 178 are conveniently maintained at the zero voltage level while grids 180 are suitably connected to a −25 volts. Electrons emitted from the flood guns diverge into a wide beam which is substantially uniformly distributed toward the target 196.

A plurality of electrodes are also provided on the inner surface of envelope 160 beyond the flood guns. A first electrode 184, connected to the midpoint of a voltage divider comprising resistors 186 and 188 coupled between +250 volts and ground, acts to provide a more uniform electric field to collimate electrons. A collector electrode 190 near the target end of the tube is connected at the midpoint of a voltage divider including resistors 192 and 194 coupled between a +500 volts and ground. This electrode can perform the additional function of collecting secondary electrons as will hereinafter become more evident.

Storage target 196 is disposed on the inner side of a glass end plate 198 and includes a transparent target electrode 200 over which is disposed a dielectric 202, comprising an integral layer of P–1 type phosphor. Target electrode 200 is a thin transparent conductive coating such as tin oxide or the like and is coupled to the midpoint of a voltage divider comprising resistors 206 and 208 disposed between a +500 volts and ground. The tube voltages are selected to result in a secondary emission characteristic for the tube as illustrated in FIG. 4 where secondary emission ratio is plotted against target potential.

Horizontal and vertical deflection signals are provided to horizontal and vertical deflection plates 172 and 174 respectively from X deflection circuit 158 and Y deflection circuit 160. These deflection circuits are respectively controlled by digital to analog converter 152 and digital to analog converter 154 to cause deflection of the tube's electron beam 170 in proportion to the outputs of the respective digital to analog converters and therefore in proportion to the contents of position registers 26 and 30 respectively. Control grid 166 of the principal electron gun is connected to Z axis enable circuit 156 which applies a Z signal voltage to grid 166 when plotting instructions are to be displayed and stored. Circuit 156 applies a Z signal voltage to grid 166 for writing information charges by means of beam 170 on storage target 196 through he process of secondary emission. The tube potentials are arranged such that beam 170 has a relatively high velocity for "writing" information. The beam is capable of producing secondary electrons when it strikes storage dielectric 202. Secondary electrons are then suitably collected by collector 190 in which case the potential of collector 190 is suitably adjusted to be just slightly higher than the potential of target electrode 200. The storage dielectric 202 may alternatively have a sufficiently porous structure to enable secondary electrons emitted from the bombarded surface of dielectric 202 to be transmitted therethrough and be collected at the target electrode.

The production of secondary electrons from an elemental area of dielectric 202 on target 196 causes such area to become relatively positive. Such area is retained at a relatively positive potential after beam 170 has moved passed such elemental area because of the action of flood guns 176. Flood guns 176 produce relatively low velocity electrons which strike the target but which ordinarily have insufficient velocity for writing information thereon. When the electrons from flood guns 176 strike areas of the target upon which a positive charge has not been written, these flood electrons tend to maintain such areas at the relatively negative potential of a flood gun, e.g., 0 volts. However, the flood gun electrons are attracted by positive elemental areas and obtain a high velocity with respect to these areas producing continued secondary emission therefrom such that these areas are maintained relatively positive or near the potential of target electrode 200 and collector electrode 190. The target thus has bistable properties and is capable of retaining information written thereon, with the flood beams of electrons driving target areas toward one of two stable potentials depending upon the information written thereon with beam 170.

Examining the secondary emission ratio versus target potential curve for the target acted on by the flood gun, which curve is illustrated in FIG. 4, we see three points at which the secondary emission ratio is equal to one. At $V_d$, $\delta=1$, because the target, and specifically the inside surface of dielectric 202, has collected sufficient electrons to charge a few tenths of a volt negative with respect to the flood gun cathode, thereby rejecting all electrons. At $V_e$, the acceleratng potential is high enough for the material on the target dielectric surface to emit secondary electrons, and at $V_f$ the target dielectric surface has charged a few volts higher than the collector and all secondary electrons in excess of primary electrons are returned to the target. $V_d$ and $V_f$ are stable potentials. If the target begins to rise above $V_d$, the target collects electrons, the secondary emission being less than one, and the target dielectric charges negatively storing restoring the target dielectric to $V_d$. If we bombard the target with a high energy electron beam 170, and allow it to charge by secondary emission to any potential just under $V_e$, it will return under the action of the flood guns to $V_d$. However, if we allow it to charge more positively than $V_e$, due to the action of beam 170, the secondary emission caused by the flood electrons will charge the target dielectric positively until it reaches $V_f$, thus writing information. If it passes $V_f$, the secondary emission ration becomes less than one and any electrons arriving tend to charge the target negatively. $V_e$ is described as the first crossover voltage of the secondary emission characteristic. A storage tube and target of the type described above are set forth and claimed in Robert H. Anderson U.S. Pat. No. 3,293,473, granted Dec. 20, 1966, and entitled THIN POROUS STORAGE PHOSPHOR LAYER.

The pulse outputs from X register 40 and Y register 50 which are coupled to position registers 26 and 30 are coupled to increment these registers in a higher order bit position for checking than is the case when the apparatus is employed for moving a cutting tool or the like. In other words, the "resolution" of the feedback pulses is changed. In the case of the embodiment illustrated in FIG. 3, the position registers 26 and 30 are incremented at binary bit positions corresponding to 0.0256 inches, and as understood the sign of the increment is in accord with the direction of movement or the sign of the difference between the command and position registers. Since the X and Y deflection voltages for tube 158 are in effect taken from position registers 26 and 30, the electron beam 170 will trace a line corresponding to the linear interpolation produced by the digital differential analyzers for each block of tape information. The adders 42 and 52 are operated at an adding rate determined by a timing pulse generator 210 rather than being operated from the output of regulator 130 as when controlling a cutting tool or the like. Timing pulse generator 210 produces an adding rate corresponding to the maximum adding rate of which the digital differential analyzers are capable. Timing pulse generator 210 is synchronized to operate in conjunction with blocks of input information read by tape reader 14, via lead 87'. However, frequency output of the timing pulse generator 210 is not determined by the feedrate information recorded on the tape.

As a consequence of operation of the apparatus according to the present invention in the checking mode, a contour plot of the tape instructions will be traced on the phosphor dielectric 202 of storage tube 158. Because of the bistable properties of the tube brought about by secondary emission as hereinbefore described, the trace will be retained on the cathode ray tube screen for as long as desired, without any requirement for a refreshing retrace or the like. Checking and verifying of the tape information is rapid and quite graphic, while providing a semi-permanent representation which may be studied at some length.

The storage tube may be coupled to the apparatus according to the present invention via D to A converters 152 and 154 during regular operation. Thus, a tape may be first rapidly verified for providing the storage of the contour indicated on the tape, after which the tape is employed for operation of a machine tool or the like. The electron beam will then move in step with the cutting tool and the machine operation is monitored for making sure the contour then executed by machine is the same as the one previously stored.

And-gates 212 and 214 are included in lines 144 and 148 respectively for discontinuing further addition to position registers 26 and 30 when the difference as detected by subtract circuits 28 and 32 is less than 0.0256 inches. Thereupon, another block of information will be read on the tape by tape reader 14 operated by timing circuitry, not shown.

Although the circuit according to FIG. 3 is suitably an alternative connection of the FIG. 1 circuit, as is accomplished electronically as will be well understood by those skilled in the art, it is readily apparent the circuit according to FIG. 3 may be provided as a separate entity for tape verification purposes.

CONVERTER

Figure 5:
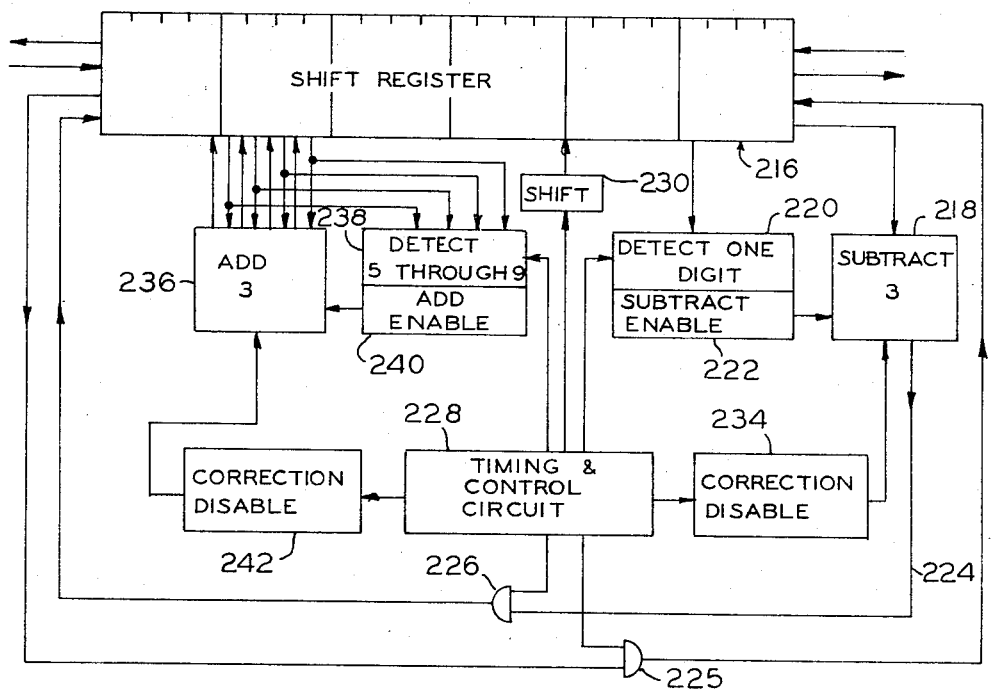
FIG. 5 is a block diagram of a code converter according to the present invention.

Converter 16 in FIGS. 1 and 3 is employed to convert the binary coded decimal information provided by tape reader 14 into a straight binary representation for convenient operation of the apparatus according to the present invention. This conversion takes place for the instructions whether they pertain to the X or Y coordinates of the position to which a controlled device is commanded to move, the feedrate command, or mode commands. Also, this same converter is employed for converting straight binary coded information to binary coded decimal, as for reading out the position indicated by the contents of registers 26 and 30. This position information is frequently desired in decimal form for operation of position indicating devices, for instance Nixie tubes or the like (not shown). The converter 16, further illustrated in block diagram form in FIG. 5, is effective for making either type of conversion employing a single shift register 216, and a minimum of apparatus for making the conversion.

The shift register 216 is divided into six decades of four digits each, wherein each such decade may represent a binary coded decimal digit.

First, conversion from binary coded decimal to binary form is described. The shift register 216, which comprises a 24 bit register, receives the binary coded decimal digits in serial fashion from the left end of the register as illustrated in FIG. 5. As soon as the BCD (binary coded decimal) number is loaded into the register, conversion operation can commence. The number in the register will be recirculated into the register via subtractor 218 and and-gate 226. However, the status of the highest order bit of each BCD digit in each register decade is checked by detection circuit 220. First, the status of bits 4, 8, 12, 16, and 20 is checked, as the contents of the register shifts to the right, wherein the numbering of the bits is indicated relative to their original position from the right-hand end of the shift register. Shifting is under control of timing and control circuit 228 which operates shift means 230. Similarly detection circuit 220 is timed by circuit 228 to check every fourth digit when it shifts into the highest order digit position of the right-hand decade in register 216. Each time a one digit is detected by circuit 220, subtract enable circuit 222 operates subtractor 218 for serially subtracting 3 from the particular BCD digit. After the entire sequence is shifted back into the register, the register content is shifted one "additional" position to the right, i.e., a twenty-fifth shift, and another conversion cycle is started. This time the status of bits 5, 9, 13, 17 and 21 is checked and corrections are made accordingly with respect to BCD numbers as would include the aforementioned bits 5, 9, 13, 17 and 21 as their highest order bits. Each time a bit is detected in the aforementioned positions, a 3 is again subtracted. After the sequence of bits is shifted back into the shift register, an additional shift to the right is made and bits 6, 10, 14, 18 and 22 are checked and −3 corrections made accordingly. Each time the entire sequence is shifted back into shift register 216, one more shift to the right is made and the sequence of operation is again repeated until 24 such "additional" shifts to the right have been made, and all combinations have been tested by detector 220. After 24 such "additional" shifts, the sequence of digits will have returned to their original position along the register, but the register will now contain a binary number instead of a BCD number, said binary number equaling the value of the original BCD number.

As will be understood by those skilled in the art, the foregoing process is similar in function to a BCD to binary conversion employing a plurality of detection circuits of the 220 type and a plurality of subtractors of the 218 type, one such combination for each decade of register 216. However, the present apparatus accomplishes this function in a serial-serial mode with appreciably less circuitry than has been heretofore possible.

An additional operation which must take place with the conversion is provided by correction disable circuit 284. After the first four circulations, including four of the said "additional" shifts to the right, the digits appearing in the left-hand decade of shift register 216 will have been corrected. Therefore, during the fifth cycle, the detector 220 will test digits 8, 12, 16, and 20, but subtraction for the twenty-fourth bit position will be disabled by correction disable circuit 234. After eight cycles, the subtractor circuit 218 is disabled for the last two of its possible testing operations, and so on, until after 24 operating cycles, subtractor 218 will be disabled entirely, and the correct binary number will appear in register 216. It is understood that a timing and control circuit 228 not only produces time shifting of register 216 via shift control 230, and timed operation of detection circuit 220, but also operates correction disable circuit 234 in proper timed relation. Furthermore, circuit 228 enables and-gate 226 for recirculation during the BCD to binary conversion operation.

As hereinbefore mentioned, register 216 together with the attendant circuitry can also be employed to convert from straight binary form to binary coded decimal form. Operation is similar to the previously described conversion, but wherein the process is substantially reversed. A number to be converted is shifted into register 216 from right to left and then is circulated a plurality of times from right to left and through and-gate 225 back into the register. Initially, the binary number in register 216 will be loaded into not more than the lower 20 bit positions of the register, or the lower 5 decades. Then, circuit 238 will test the highest decade of information present in the register to determine whether the four digits thereof represent the number 5 through the number 9. If so, detection circuit 238 operates add enable circuit 240 to cause adder 236 to add 3 to the four digit sequence, as such sequence is shifted one digit position to the left. Addition is accomplished in parallel fashion. The contents of the shift register are shifted a total of four positions to the left before detector 238 is again operated by timing and control circuit 228 to test four successive digits at the location indicated. After five groups of four digits have been checked and the contents of the register have been recirculated back into the register via and-gate 225, the contents of the register are shifted one "additional" bit position to the left. Then the sequence is repeated, testing groups of four digits and adding 3 by means of adder 236 if the aforementioned four digits comprise a binary sequence equaling 5 through 9. The operation continues until 24 such "additional" shifts have taken place, and the digital information is returned to its original location in the shift register. However, the information will have been converted to binary coded decimal form, with each (possible) binary coded digit residing in one of the decades of register 216.

As in the case of BCD to binary conversion, arithmetic operations are not performed upon the corrected number which is recirculated back into the register. Thus, after four "additional" shifts, the adder 236 is disabled for the lower four bits of the circulated total. After four more "additional" shifts, correction disable circuit 242 prevents adder 236 from operating for the eight less significant bits and so on. Again, timing and control circuit 228 operates correction disable circuit 242, as well as detection circuit 238 and shifting means 230, in a conventional manner. Also, circuit 228 energizes and-gate 225 for binary to BCD conversion.

As in the case of BCD to binary conversion, the last described operation is similar to successively checking four bit groups by means of a plurality of detectors and simultaneously applying the arithmetic correction to these groups. However, the present system employing a serial-serial approach, enables the same correction with a minimum of equipment.

The conversion steps described above for either conversion may be best understood by first considering the binary to BCD conversion. In converting from a binary number to a BCD equivalent, each "1" digit is raised to the $2^{n-1}$ power wherein $n$ is the order of location of the digit. The desired BCD number can be procured by summing these values. Employing a shift register, each binary digit is doubled by a shift operation, thereby achieving the above purpose of raising 2 to a power. However, when a bit is shifted from the last stage of one decade of the register to the first stage of the next, its decimal value increases to 10 while the actual value thereof should double to $2^4$. The difference can be corrected by adding 6, the difference between $2^4$ and 10. However, if a 3 is added, the next shift operation will provide doubling to 6. The addition of 3 is made whenever the decade contains the binary number 5 or greater. The BCD to binary operation is essentially the reverse where the 3 is subtracted instead of added.

SELECTOR CIRCUIT

Figure 7:
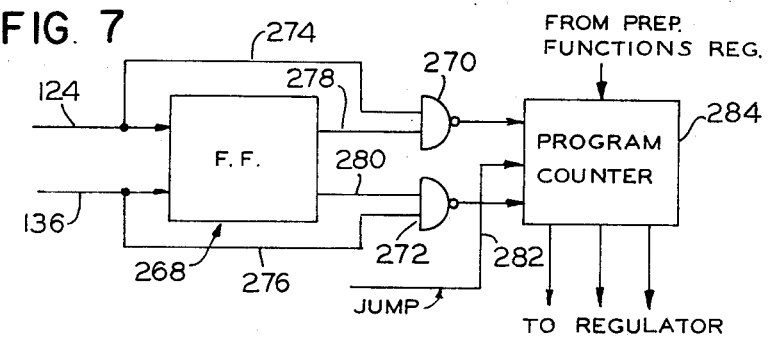
FIG. 7 is a block diagram of a selector circuit utilized according to the present invention as in FIG. 2.

Selector circuit 132, as referred to in the FIG. 2 block diagram, is illustrated in greater detail in FIG. 7. This circuit receives instructions from the preparation functions register 84 which in turn receives information from converter 16 and the input tape. The instructions from the preparation functions register operate a program counter 284 which steps through the following procedural levels for operating overall control and timing circuitry (not shown). These counting steps are as follows:

0 Stop, Read
1 Select sign of command minus position
2 Load deltas into registers 38 and 48
3 Normalize registers 38 and 48
4 Stop
5 Accelerate
6 Feed
7 Decelerate
8 Possible external cycle
9 Possible external cycle After the sequence of steps is executed, the sequence is repeated, i.e., for reading each additional block of information on the input tape followed by executing the instructions given thereby. During mode B, as soon as deceleration would ordinarily be initiated in step 7, the counter directs tape reading followed by steps 1, 2 and 3, but skipping steps 4 and 5, for maintaining a substantially continuous feed.

During mode A, wherein acceleration and deceleration are programmed for each block of input information, the program counter 284 is also responsive to the frequency of the inputs provided on leads 124 and 136 as hereinbefore indicated. The FIG. 7 selector circuit detects whether the frequency of the input on lead 124 is larger or whether the frequency of the input on lead 136 is larger, and may direct program counter 284 to change its output from one directing acceleration to one directing feed, or to provide a change from feed to deceleration. If the frequency on lead 124 is larger, flip-flop 268 will be set by each pulse thereof and provide an output on lead 278. Simultaneous inputs on leads 274 and 278 will operate and-gate 270, indicating to program counter 284 that the signal on lead 124 is higher in frequency. The lead 124 signal will be capable of setting flip-flop 268, while subsequently coinciding with the output "set" condition thereof indicated on lead 278. The input on line 136 would not be capable of operating and-gate 272 via lead 276 unless the frequency of the signal on lead 136 is higher than the frequency of the signal on line 124. Thus, if the input on lead 136 is lower in frequency, even though it resets flip-flop 268, the same will be set again, removing the output on lead 280, before another pulse on line 136 occurs. The circuit is thus employed as a frequency comparator, and is utilized for comparing feedrate frequency information from feedrate frequency generator 134 with the overflow from register 122. The FIG. 7 circuit provides outputs to regulator 130 in accordance with whether acceleration, deceleration, or feedrate operation is desired. The circuit also provides a control signal designated "ACC." to other system circuits, at the time acceleration is indicated.

If compare circuit 142 so dictates, a signal is provided on lead 282 for jumping the program counter past step 6 indicated above, directly to deceleration, for the case when very short segmental movements are indicated and wherein deceleration should occur sooner in order to avoid overshoot.

REGULATOR

Figure 6:
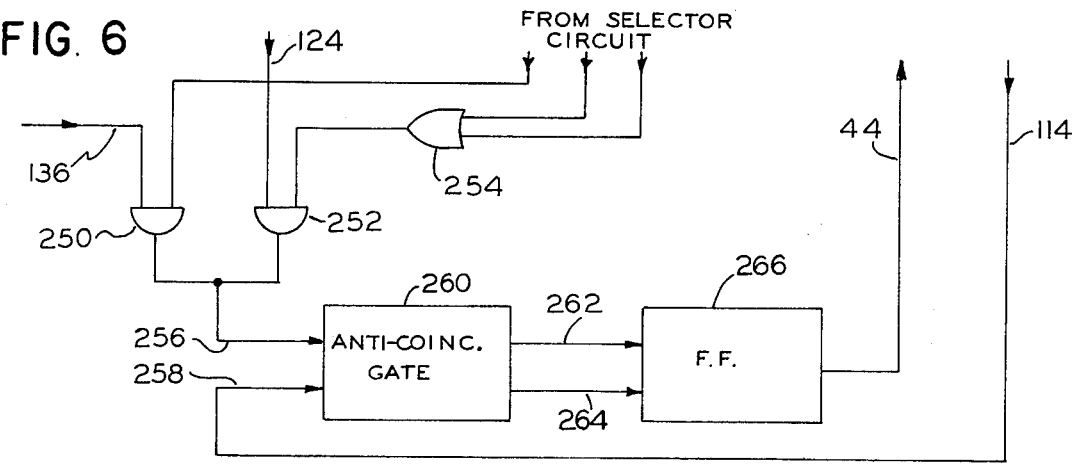
FIG. 6 is a more detailed diagram of a regulator forming a portion of the FIG. 2 circuit.

Regulator 130, as indicated in FIG. 2, is illustrated in greater detail in FIG. 6. Thus, circuit receives inputs from the program counter 284 for programing the regulator according to whether acceleration, deceleration or feedrate operation is desired. When either acceleration or deceleration is indicated, corresponding signals energize one input of and-gate 252 via or-gate 254, such that the overflow signal 124 from register 122 will be gated to anti-coincidence gate 260. On the other hand, if the selector circuit indicates feedrate operation, an and-gate 250 will be enabled for passing the feedrate frequency generator output on lead 136 to anti-coincidence gate 260. The input on lead 256 to anti-coincidence gate 260 normally sets flip-flop 266 via lead 262, whereby an output is provided on line 44 causing adders 42 and 52 in FIG. 1 to operate at a (80 Kilohertz) rate. When the axis digital differential analyzers respond and provide an output, the signal on lead 114 resets the flip-flop 266 via anti-coincidence gate input 258 and lead 264. The anti-coincidence gate 260 prevents switching of flip-flop 266 if inputs arrive on leads 256 and 258 at the same time. Anti-coincidence gate 260 operates only if controlled device velocity is fairly high, and prevents improper system operation by preventing premature setting and resetting of the flip-flop.

TRANSDUCER INTERFACE

Figure 8:
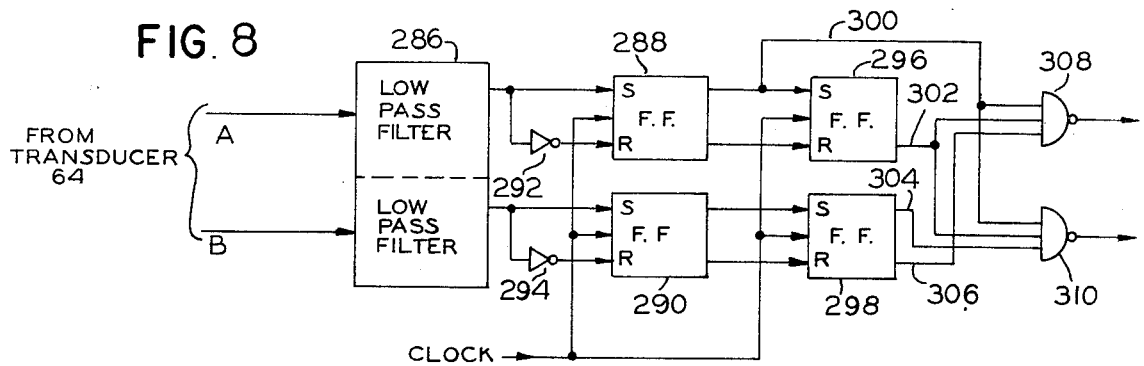
FIG. 8 is a block diagram of a transducer interface unit employed in the FIG. 1 apparatus.

The transducer interface, numbered 66 in FIG. 1, is illustrated in greater detail in FIG. 8. Transducer 64 provides a pair of quadrature pulse outputs the "phase" of which is indicative of the direction of rotation of particular transducer. For example, during rotation of motor 10, transducer 64 will first produce a pulse output on line A, followed by an overlapping pulse output on line B. The FIG. 8 circuit differentiates these pulses and times the same in relation to the system clock.

The outputs A and B are coupled via low pass filters, indicated at 286, to flip-flops 288 and 290 respectively. The presence of a pulse sets one of the flip-flops, while its absence resets such flip-flop through an inverting amplifier 292 or 294. The flip-flops 288 and 290 are "J-K" flip-flops, as well known in the art, and will change the output provided thereby at the time a clock input is received. The flip-flops are also designed to have an approximately 1 volt built in hysteresis characteristic so that the inputs applied thereto must change by such value in order to prospectively change a flip-flop from a set condition to a reset condition. This characteristic, together with employment of low pass filters 286, greatly enhances the noise immunity of circuit.

296 will not be set us assume that flip-flop 288 is set by a given A pulse. Flip-flop 288 will provide an output for setting flip-flop 296, and will also provide an output on line 300 to gates 308 and 310. Flip-flop until the clock pulse following the one which sets flip-flop 288. Cfnsequently, flip-flop 296 will provide a not" output on line 302 until set by the next clock pulse. Two inputs for and-gate 308 will thus be energized and a third output on lead 306 is also provided as hereinafter indicated. Therefore, and output will be produced by and-gate 308, such output having a duration equal to the clock pulse period. When flip-flop 296 is "set" by the next clock pulse the output from and-gate 308 is discontinued. The presence of an output from gate 308 will also indicate a first direction of rotation for motor 10. If the B pulse had been received first, there would have been no energizing output for gate 308 on lead 306 at this time.

On the other hand, if the X motor 10 had been turning in the opposite direction, flip-flops 290 and 298 would have operated in substantially the same manner as hereinbefore described for flip-flops 288 and 296. Consequently, a pulse output would be provided by flip-flop 298 on lead 304 for energizing and-gate 310 at the same time as inputs were present on leads 300 and 302. The resulting output from and-gate 310 would indicate the opposite direction of rotation for the X motor.

The pair of outputs provided by the transducer interface will step register 26 and error counter 58 in a direction dependent upon the sign of the output. Thus, a "positive" output from gate 308 will step register 26 and error counter 58 in a position direction, while and output from and-gate 310 will step register 26 and error counter 58 in a "negative" direction. Transducer interface 78 operates in substantially the same manner as described for interface 66. As will be understood by those skilled in the art, further gates 308 and 310 may be employed for utilizing further combinations of outputs from flip-flops 296 and 298 for effectively increasing the pulse rate provided by transducer 64. The transducer interface circuitry disclosed is found to provide substantial noise immunity as well as well defined pulses suitable for counting, and unfailingly delivers a proper output pulse without generation of undesired extra pulses sometimes encountered with circuitry employing Schmitt triggers and the like.

CONTROL INTERFACE

Figure 9:
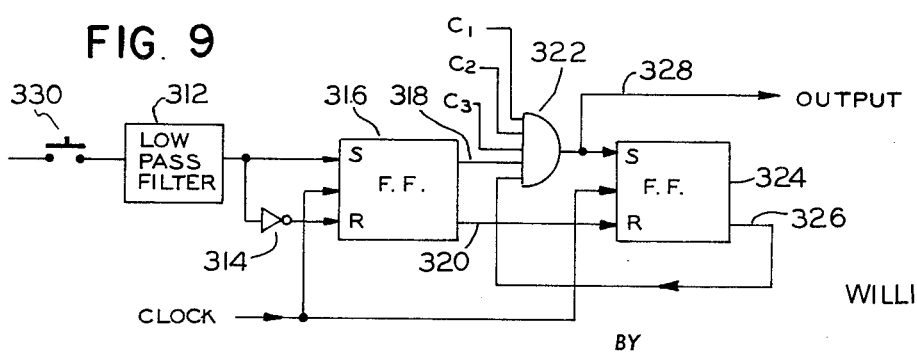
FIG. 9 is a block diagram of an additional control interface unit employed according to the present invention.

FIG. 9 illustrates a control interface circuit for use with input push buttons and the like, e.g., for commanding tape mode operation or for other control purposes. A push button 330 connects a desired signal voltage as an input to low pass filter 312, which, in turn, supplies a set input to flip-flop 316 as well as a reset input thereto via inverting amplifier 314. At the next occuring clock pulse, flip-flop 316 attains the commanded state, providing corresponding set and reset values on leads 318 and 320 for operating flip-flop 324. The output on lead 318 provides one input for and-gate 322, the output of which is connected to the set input of flip-flop 324. The same lead provides circuit output 328. Other signals, $C_1$, $C_2$, and $C_3$, prescribe synchronizing conditions and the like for operation for the circuit. The "not" output from flip-flop 324 on line 326 is also supplied as an input to and-gate 322.

The FIG. 9 circuit generates a well defined single pulse in response to a random (push button) input. Operation of push button 330 sets flip-flop 316 providing one input to and-gate 322 on line 318. The flip-flop 324 will provide a "not" output at this time on line 326 since it has not been set, and assuming the conditions $C_1$, $C_2$ and $C_3$ are met, and-gate 322 will operate to provide a set input for flip-flop 324 and an output for the circuit. Flip-flop 324 will change condition upon the occurrence of the next clock pulse, whereby the signal on lead 326 will be removed, thereby discontinuing the output on lead 328. Thus, the output on lead 328 is a well defined pulse having a duration equal to the clock pulse period. At the conclusion of the input, as when push button 330 is raised, flip-flop 316 will be reset via inverting amplifier 314, and flip-flop 324 will also be reset by way of lead 320.

While the circuitry in accordance with the present invention is illustrated for operation in two axes, it is understood that a third may be similarly controlled. Moreover, while linear interpolation in the case of each segment of a general contour is herein indicated, more complex or curved segments can be generated by known means.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Apparatus for moving a controlled device along a path, said path comprising a number of segmental portions, each between a first point and a second point, wherein the apparatus successively receives coordinate input information for directing a corresponding movement of said controlled device, said apparatus comprising:
   input register means for receiving said input information and providing a digital positional error indication in at least two axes between input information and the actual position of said controlled device,
   rate command means responsive to said digital error indication as well as a feedrate command for generating pulse outputs in two axes having output rates proportional to said feedrate command and ratioed according to the positional error in said two axes, said rate command means comprising a digital differential analyzer for each axis, each being provided with a register to which the initial error between said first point and said second point is repeatedly added in response to the feedrate command, the pulse output of each digital differential analyzer comprising the overflow of said last mentioned register,
   digital servomechanism means, and positioning motors operated thereby, responsive to said pulse outputs to provide movement of said controlled device,
   feedback means actuated by said movement of said controlled device to provide feedback pulse information in response thereto,
   and means for coupling said feedback pulse information to said input register means for updating and reducing said error indication.

2. The apparatus according to claim 1 further including means responsive to a predetermined small error indication by said input register means for disabling operation of said rate command means and causing said digital servomechanism means to retain an attained position.

3. The apparatus according to claim 1 wherein said feedback means comprises a mechanical transducer providing a pulse output in response to movement of said controlled device at the rate of movement of said controlled device.

4. The apparatus according to claim 1 wherein said feedrate command is digitally controlled and variable in response to controlled acceleration or deceleration.

5. The apparatus according to claim 1 including digital means for generating a varying feedrate command dependent upon a desired acceleration.

6. Apparatus for moving a controlled device along a path, said path comprising a number of segmental portions, wherein the apparatus successively receives coordinate input information for directing a corresponding movement of said controlled device, said apparatus comprising:
   input register means for receiving said input information and providing a digital positional error indication in at least two axes between input information and the actual position of said controlled device,
   rate command means repsonsive to said digital error indication as well as a feedrate command for generating pulse outputs in two axes having output rates proportional to said feedrate command and ratioed according to the positional error in said two axes, said rate command means comprising a digital differential analyzer for each axis, each being provided with a register to which said error indication is repeatedly added in response to the said feedrate command, the pulse output of each digital differential analyzer comprising the overflow of said last mentioned register,
   digital servomechanism means, and positioning motors operated thereby, responsive to said pulse outputs to provide movement of said controlled device,
   feedback means actuated by said movement of said controlled device to provide feedback pulse information in response thereto,
   means for coupling said feedback pulse information to said input register means for updating and reducing said error indication,
   means for receiving a feedrate input value,
   and further feedback means responsive to said feedrate input value and a pulse output of said rate command means for generating a feedrate command causing said rate command means to produce an output pulse rate in accordance with said feedrate input value.

7. Apparatus for moving a controlled device along a path, said path comprising a number of segmental portions, wherein the apparatus successively receives coordinate input information for directing a corresponding movement of said controlled device, said apparatus comprising:
   input register means for receiving said input information and providing a digital positional error indication in at least two axes between input information and the actual position of said controlled device,
   rate command means responsive to said digital error indication as well as a feedrate command for generating pulse outputs in two axes having output rates proportional to said feedrate command and ratioed according to the positional error in said two axes,
   digital servomechanism means, and positioning motors operated thereby, responsive to said pulse outputs to provide movement of said controlled deivce,
   feedback means actuated by said movement of said controlled device to provide feedback pulse information in response thereto,
   means for coupling said feedback pulse information to said input register means for updating and reducing said error indication, digital means for generating a varying feedrate command for providing a desired acceleration, and means coupling the last mentioned digital means to respond to the output of said feedback means for increasing said feedrate command in relation to the movement of said controlled device so that the feedrate command increases as said movement increases.

8. The apparatus according to claim 7 including means for determining when said feedrate command results in a pulse output from said rate command means reaching a desired rate value, and means for thereupon maintaining said feedrate command for producing such output pulse rate until said positional error is substantially reduced.

9. The apparatus according to claim 7, including means for determining when said feedrate command results in a pulse output from said rate command means reaching a desired rate value, means for thereupon maintaining said feedrate command for producing such output pulse rate until said positional error is substantially reduced, means for detecting a decrease in positional error below a predetermined value, and means connected to said means for generating a varying feedrate command and responsive to said detection for decreasing said feedrate command and decelerating said controlled device.

10. The apparatus according to claim 9 further including means for detecting when acceleration causes movement approximately equal to the movement required for deceleration, and means for commanding an immediate decrease in said feedrate to provide a deceleration mode.

11. The apparatus according to claim 7 wherein said rate command means comprise a digital differential analyzer for each axis, each being provided with a register to which said error information is repeatedly added in response to the same feedrate command, the pulse output of each digital differential analyzer comprising the overflow of said last mentioned register.

12. The apparatus according to claim 7 wherein said means coupling the last mentioned digital means to respond to the output of said feedback means includes additional rate command means receiving an input in response to movement of said control device as detected by said feedback means, and means for bringing about correspondence between outputs of the first mentioned rate command means and additional rate command means.

13. The apparatus according to claim 12 wherein said additional rate command means comprises a digital differential analyzer.

14. Apparatus for moving a controlled device along a path, said path comprising a number of segmental portions, wherein the apparatus successively receives coordinate input information for directing a corresponding movement of said controlled device, said apparatus comprising:

input register means for receiving said input information and providing a digital positional error indication in at least two axes between input information and the actual position of said controlled device, rate command responsive to said digital error indication as well as a feedrate command for generating pulse outputs in two axes having output rates proportional to said feedrate command and ratioed according to the positional error in said two axes, said rate command means comprising a digital differential analyzer for each axis, each being provided with a reguster to which said error indication is repeatedly added in response to the said feedrate command, the pulse output of each digital differential analyzer comprising the overflow of said last mentioned register, digital servomechanism means, and positioning motors operated thereby, responsive to said pulse outputs to provide movement of said controlled device, feedback means actuated by said movement of said controlled device to provide feedback pulse information in response thereto, means for coupling said feecback pulse information to said input register means for updating and reducing said error indication, digital means for generating a varying feedrate command for providing a desired deceleration, the last mentioned digital means comprising an additional digital differential analyzer, and means coupling the last mentioned digital means to respond to the output of said input register means for decreasing said feedrate command as positional error decreases below a predetermined value and in predetermined relation with further decrease of said positional error.

15. The apparatus according to claim 14 including means for entering positional error into said additional digital differential analyzer as positional error decreases below said predetermined value.

16. Apparatus for moving a controlled device along a path, said path comprising a number of segmental portions, wherein the apparatus successively receives coordinate input information for directing a corresponding movement of said controlled device, said apparatus comprising:

input register means for receiving said input information and providing a digital positional error indication in at least two axes between input information and the actual position of said controlled deivce, rate command means responsive to said digital error information as well as a feedrate command for generating pulse outputs in two axes having output rates proportional to said feedrate command and ratioed according to the positional error in said two axes, digital servomechanism means, and positioning motors operated thereby, responsive to said pulse outputs to provide movement of said controlled device, feedback means actuated by said movement of said controlled device to provide feedback pulse information in response thereto, and means for coupling said feedback pulse information to said input register means for updating and reducing said error indication, said input register means including position register means normally updated by said feedback pulse information to provide current information on the position of said controlled device while reducing said error indication, said apparatus further including display means for receiving position information from said position register for plotting directed movement.

17. The apparatus according to claim 16, including means for coupling a pulse output from said rate command means for updating position register means in an input data checking mode.

18. The apparatus according to claim 16 wherein said display means comprises a bistable cathode ray storage tube for semi-permanently displaying a directed movement path.

19. The apparatus according to claim 16 further provided with a tape reader for receiving input information in binary coded decimal form, and a converter for converting said information into binary form for use by said input register means.

20. In apparatus for moving a controlled device along a path wherein said apparatus receives coordinate input information for directing movement of said controlled device,
digital differential analyzer means responsive to input information for generating an output having a rate to which movement of said controlled device is responsive,
means for digitally generating a determined feedrate,
and means for comparing said output rate with said determined feedrate and in response thereto controlling the adding rate input of said digital differential analyzer means to provide an output rate proportional to said determined feedrate.

21. The apparatus according to claim 20 including means for changing said digitally generated determined feedrate to provide acceleration and deceleration on command.

22. The apparatus according to claim 21 wherein said acceleration or deceleration is adaptive to actual movement of said controlled device.

23. In apparatus for moving a controlled device along a path, wherein the apparatus receives input information for directing a movement of said controlled device,
means for producing a rate signal to which the rate of movement of said controlled device is responsive,
feedback meanS actuated by said movement of said controlled device to provide feedback information in response thereto,
and means coupled to said means for producing a rate signal and responsive to said feedback information for increasing said rate signal as said controlled device moves to provide adaptive acceleration of said controlled device.

24. The apparatus according to claim 23 including means for determining when said rate signal reaches a desired feedrate value, and means coupled to said means for producing a rate signal for thereupon maintaining said rate signal at the same value for at least a predetermined proportion of said movement.

25. The apparatus according to claim 23 including means for determining when said rate signal reaches a desired feedrate value,
means for thereupon maintaining said rate signal the same for a predetermined proportion of said movement,
and means coupled to said means for producing a rate signal and responsive to said feedback information for decreasing said rate signal near the end of said movement in relation to the remaining distance of the desired movement.

26. The apparatus according to claim 23 including means for detecting when the increase in said rate signal causes translation of said controlled device approximately equal to the translation required for deceleration to the end of said movement, and means responsive to said detection for commanding an immediate decrease in said rate signal to provide said deceleration.

27. In apparatus for moving a controlled device along a path, wherein the apparatus receives coordinate input information for directing a corresponding movement of said controlled device,
rate command means for generating an output rate signal to which movement of said controlled device is responsive
feedback means actuated by movement of said controlled device and coupled to the rate command means for normally ascertaining and bringing about correspondence between the actual rate of movement and the output rate signal,
and means for accelerating said controlled device by gradually increasing the output rate signal of said rate command means, said means for accelerating including means responsive to said feedback means for increasing said output rate signal as said controlled device responds to the output rate signal.

28. The apparatus according to claim 27 wherein said rate command means comprises a digital differential analyzer and wherein said means for accelerating said control device by gradually increasing the output rate signal of said rate command means comprises further rate command means responsive to an input from said feedback means as the feedback means is actuated by movement of said controlled device, and means for bringing about correspondence between the outputs of the rate command means.

29. The apparatus according to claim 27 wherein said means for increasing said rate signal comprises a digital differential analyzer, said digital differential analyzer receiving information in response to said feedback means related to actual movement of said controlled device and providing an overlfow rate in proportion thereto, to which said rate signal is responsive for increasing said rate signal in an adaptive manner.

30. The apparatus according to claim 27 including means for receiving a digital representation of a particular feedrate,
means coupled to receive said rate signal and said digital representation of a particular feedrate for detecting when said rate signal provides said feedrate and connected to said rate command means for thereupon maintaining said rate signal through normal feedback operation for a predetermined proportion of said movement
means for detecting approach of the end of movement, 55
and means responsive to such detection for decreasing said rate signal near the end of said movement in proportion to the positional error remaining in said movement as indicated by said feedback means in combination with said input information.

31. In apparatus for moving a controlled device along a path, wherein the apparatus receives input information for directing a movement of said controlled device,
first digital differential analyzer means for producing a rate signal to which the rate of movement of said controlled device is responsive, means responsive to actual movement of the device for determining the remaining portion of said movement, means for detecting when the remaining portion of said movement decreases below a predetermined value, and means including additional digital differential analyzer means and responsive to said detection for decreasing said rate signal by decreasing the adding rate input to the first digital differential analyzer means as the detected remaining portion of said movement decreases below a predetermined value, and for continuing to decrease said rate signal as said remaining portion, as ascertained by said means for determining the same, continues to decrease, for providing adaptive deceleration.

32. In apparatus for moving a controlled device wherein the apparatus receives input information for directing a corresponding movement of said device, rate command means comprising a first digital differential analyzer means for generating a rate signal to which movement of said controlled device is responsive, feedback means actuated by movement of said controlled device, means responsive to said feedback means for determining the remaining portion of said movement, and means including a second digital differential analyzer means for decreasing said rate signal by decreasing the adding rate input to the first digital differential analyzer means when said remaining portion decreases below a predetermined value, and in substantial proportion to the portion of said movement remaining.

33. The apparatus accordinG to claim 32 wherein said second digital differential analyzer means receives error information related to the remainder of said movement and provides an overflow rate in proportion thereto, to which said rate signal is responsive for decreasing said rate signal.

34. The apparatus according to claim 33 including means responsive to the overflow rate of the second digital differential analyzer means for providing an adding rate input to the first digital differential analyzer means causing a correspondence between the outputs of said digital differential analyzer means.

35. Apparatus for displaying input information wherein said input information is adapted to define plural successive segmental portions of a contour, said apparatus comprising:

means for providing repetitive outputs representative of each said segmental portion, register means for receiving and accumulating said repetitive outputs, and bistable cathode ray storage tube means substantially continuously responsive to the accumulation in said register means for providing a visual indication of said segmental portions comprising said contour.

36. Apparatus for verifying input information wherein said information is adapted for directing a controlled device along a path comprising a number of segmental portions, said apparatus comprising:

means for developing repetitive output information in two axes proportional to said input information for each of said segmental portions, position register means for receiving said repetitive output information and accumulating positonal coordinate information, digital to analog converter means responsive to said position register means for developing analog values in proportion to the contents of said position register means, and display means for receiving the outputs of said digital to analog converter means to provide an analog display representative of said input data as said position register means is receiving said repetitive output information, said display means comprising a cathode ray storage tube having deflection means operatively coupled to said digital to analog converter means for deflecting the electron beam thereof to produce a stored image.

37. The apparatus according to claim 36 wherein said display means comprises a bistable cathode ray storage tube having a storage target, said storage tube being provided with flood gun means for retaining and displaying the contour traced by said electron beam on said storage target under the direction of said deflection means.

38. Verification apparatus for receiving successive segmental input instructions representative of a contour and for displaying the same, said apparatus comprising:

means for receiving said successive segmental input instructions in digital form and providing impulse outputs at frequencies proportional to the desired segmental movement in at least two axes, and bistable cathode ray storage tube means having deflection means responsive to said impulse outputs to provide a semi-permanent display of the indicated contour, said display concurrently exhibiting plural segments of said contour.

39. Verification means for checking input data representative of a contour, comprising:

input register means for receiving said data and including position register means, said input register means providing a digital positional error indication in at least two axes between input information and the contents of the position register means, rate command means responsive to said digital error indication for generating pulse outputs in two axes having output rates ratioed according to the positional error in said two axes, and display means for receiving and displaying positional information from said position register means for plotting said input data.

40. The apparatus according to claim 39 wherein said rate command means comprises a digital differential analyzer for each axis, each being provided with a register to which error information is repeatedly added, the pulse output of each digital differential analyzer comprising the overflow of said last mentioned register.

41. The apparatus according to claim 39 wherein said display means comprises a bistable cathode ray storage tube for semi-permanently displaying said contour.

42. The apparatus according to claim 39 including means for coupling an output from said rate command means for updating said position register means.

43. The apparatus according to claim 39 wherein said display means comprises a cathode ray storage tube for semi-permanently displaying said contour.

44. The method of operating a numerical control system, said control system including position registers for registering the current position of a controlled device, and display means responsive to said position registers for displaying a contour, said method comprising:
- first operating said numerical control system with internal feedback for operating said position registers without actual movement of the controlled device to provide a stored plot of the input instruction on said display means,
- and then operating said numerical control system to move said controlled device while continuing to apply information from said position registers to said display device for retracing a previously stored contour, for monitoring operation of said control system.

45. Apparatus for moving a controlled device along a path, said path comprising a number of segmental portions, wherein the apparatus successively receives coordinate input information for directing a corresponding movement of said controlled device, said apparatus comprising:
- input register means for receiving said input information and providing a digital positional error indication between input information and the actual position of said controlled device,
- command means responsive to said digital error information for providing a command output at a corresponding rate,
- servomechanism means, and positioning means operated thereby, responsive to said command output to provide movement of said controlled device,
- and means responsive to a predetermined small error indication produced by said input register means for substantially discontinuing said command output and switching said servomechanism means to a position retaining mode,
- said servomechanism means being provided with increased gain in said position retaining mode under small error conditions.

46. Apparatus for providing a display responsive to successive segmental input instructions representative of a contour, said apparatus comprising:
- means for receiving said successive segmental input instructions in digital form and for registering changing positional information in at least two axes as modified by said successive segmental input instructions,
- and a cathode ray storage tube having deflection means responsive to said positional information in said two axes, and repeatedly responsive thereto as said positional information is modified by said successive segmental input instructions, to provide a continuous contour display formed of consecutively stored and successively joined display segments which are retained by said cathode ray storage tube for viewing of a complete contour.

47. The method of displaying a contour from electrically supplied input information comprising:
- receiving input information adapted to define successive segmental portions of said contour,
- generating updated positional information in response to said reception of input information,
- and storing such positional information on a cathode ray storage tube including rendering the cathode ray storage tube repeatedly responsive to said positional information to provide a continuously retained contour display formed of consecutively stored and successively joined display segments.

* * * * *

UNITED STATES PATENT OFFICE
CERTIFICATE OF CORRECTION

Patent No. 3,757,095　　　　　　　　Dated September 4, 1973

Inventor(s) William B. Kiwiet

It is certified that error appears in the above-identified patent and that said Letters Patent are hereby corrected as shown below:

Column 5, line 9, "digital" should be --digitally--.
  Column 6, line 55, "lInear" should be --linear--.
  Column 7, line 53, "the counter" should be --the count--.
  Column 9, line 53, "inedpendent" should be --independent--.
  Column 10, line 8, "feedrAte" should be --feedrate--.
  Column 10, line 42, after "differential" delete "and".
  Column 13, line 24, "he process" should be --the process--.
  Column 14, line 12, delete "storing".
  Column 17, lines 11 and 12, "location" should be --locations--.
  Column 19, line 56, "296 will not be set" should be --Let--.
  Column 19, line 59, after "Flip-flop" insert --296 will not be set--.
  Column 19, line 61, "Cfnsequently" should be --Consequently--.
  Column 19, line 65, "and output" should be --an output--.
  Column 20, line 20, "while and" should be --while an--.
  Column 22, line 14, "repsonsive" should be --responsive--.
  Column 22, line 62, "deivce" should be --device--.
  Column 23, line 64, after "rate command" insert --means--.
  Column 24, line 16, "feecback" should be --feedback--.
  Column 24, line 43, "deivce" should be --device--.
  Column 25, line 41, "meanS" should be --means--.
  Column 26, line 56, delete "55".
  Column 27, line 36, "accordinG" should be --according--

Signed and sealed this 23rd day of April 1974.

(SEAL)
Attest:

EDWARD M.FLETCHER,JR.　　　　　　　　C. MARSHALL DANN
Attesting Officer　　　　　　　　　　Commissioner of Patents